US009596051B2

(12) United States Patent
Harris et al.

(10) Patent No.: US 9,596,051 B2
(45) Date of Patent: Mar. 14, 2017

(54) INHIBITING UNAUTHORISED CONTACTLESS READING OF A CONTACTLESS READABLE OBJECT

(71) Applicant: Harris Teece Pty Ltd, Artarmon, New South Wales (AU)

(72) Inventors: Tyler Raymond Harris, New South Wales (AU); Richard Lennox Teece, New South Wales (AU)

(73) Assignee: HARRIS TEECE PTY LTD, Artarmon, New South Wales (AU)

( * ) Notice: Subject to any disclaimer, the term of this patent is extended or adjusted under 35 U.S.C. 154(b) by 0 days.

(21) Appl. No.: 14/649,907

(22) PCT Filed: Dec. 5, 2013

(86) PCT No.: PCT/AU2013/001415
§ 371 (c)(1),
(2) Date: Jun. 4, 2015

(87) PCT Pub. No.: WO2014/085862
PCT Pub. Date: Jun. 12, 2014

(65) Prior Publication Data
US 2015/0311998 A1    Oct. 29, 2015

(30) Foreign Application Priority Data

Dec. 5, 2012 (AU) .............................. 2012905294

(51) Int. Cl.
*H04K 3/00* (2006.01)
*G06K 19/073* (2006.01)
(Continued)

(52) U.S. Cl.
CPC .............. *H04K 3/41* (2013.01); *G06F 3/041* (2013.01); *G06K 7/10257* (2013.01);
(Continued)

(58) Field of Classification Search
CPC .............................. H04K 3/86; H04K 2203/20
(Continued)

(56) References Cited

U.S. PATENT DOCUMENTS 7,221,900 B2    5/2007 Reade et al.
7,283,044 B2    10/2007 Bandy
(Continued)

FOREIGN PATENT DOCUMENTS

| FR | 2 923 309 A1 | 5/2009 |
| WO | WO2004102313 A2 | 11/2004 |
| WO | WO2005052846 A2 | 6/2005 |

OTHER PUBLICATIONS

Rieback, M.R. et al. "A Platform for RFID Security and Privacy Administration", Proceedings of the 20th conference on Large Installation System Administration (LISA '06), Washington DC, Dec. 2006, pp. 89-102. Retrieved from Internet <URL:http://www.rfidguardian.org/images/a/a9/Lisa.06.pdf> [retrieved on Aug. 20, 2013] pp. 3, 8-10.

(Continued)

*Primary Examiner* — Kevin Kim
(74) *Attorney, Agent, or Firm* — Seed IP Law Group LLP

(57) ABSTRACT

A jamming device for inhibiting unauthorized contactless reading of a contactless readable object is disclosed. In one embodiment, the jamming device includes: an antenna for receiving an interrogation signal from a reader device; a touch sensitive interface; and a circuit electrically connected to the antenna and the touch sensitive interface, wherein the circuit is configured to: operate in a first mode to generate and emit a jamming signal, via the antenna, in response to receiving the interrogation signal while the touch sensitive interface fails to indicate a touch event; and operate in a second mode while the touch sensitive interface indicates a touch event, wherein the jamming signal is not emitted via the antenna in response to receiving the interrogation signal while operating in the second mode. A card carrying object, system and method is also disclosed.

20 Claims, 12 Drawing Sheets

(51) Int. Cl.
*G06K 19/077* (2006.01)
*G06F 3/041* (2006.01)
*G06K 7/10* (2006.01)
*H04W 12/08* (2009.01)
*H03K 17/96* (2006.01)

(52) U.S. Cl.
CPC . *G06K 19/07336* (2013.01); *G06K 19/07701* (2013.01); *H04K 3/45* (2013.01); *H04K 3/86* (2013.01); *H04W 12/08* (2013.01); *G06K 19/07715* (2013.01); *H03K 17/962* (2013.01); *H04K 3/43* (2013.01); *H04K 3/46* (2013.01); *H04K 2203/20* (2013.01); *H04K 2203/32* (2013.01); *H04K 2203/34* (2013.01)

(58) Field of Classification Search
USPC .................................. 340/572.3, 505, 572.4
See application file for complete search history.

(56) References Cited

U.S. PATENT DOCUMENTS

| | | |
|---|---|---|
| 7,889,056 B2 | 2/2011 | Horne |
| 2004/0100359 A1 | 5/2004 | Reade et al. |
| 2007/0152829 A1 | 7/2007 | Lindsay et al. |
| 2009/0224035 A1 | 9/2009 | Deborgies |
| 2009/0258592 A1 | 10/2009 | Huang |
| 2011/0254665 A1 | 10/2011 | Lindsay et al. |

OTHER PUBLICATIONS

Sample, A. P. et al. "A capacitive touch interface for passive RFID tags" 2009 IEEE International Conference on RFID, Orlando, pp. 103-109. Retrieved from Internet <URL: http://wisp.wikispaces.com/file/view/RFID09_CapSense.pdf> [retrieved on Sep. 25, 2013].
Zois, Charalampos I. "Design and Implementation of the RFID Guardian User Interface for Mobile Devices" Masters Thesis in Computer Science, Jul. 2008.
http://venturebeat.com/2012/02/18/researchers-create-onoff-switch-forcredit-cards-to-prevent-rfid-theft/.

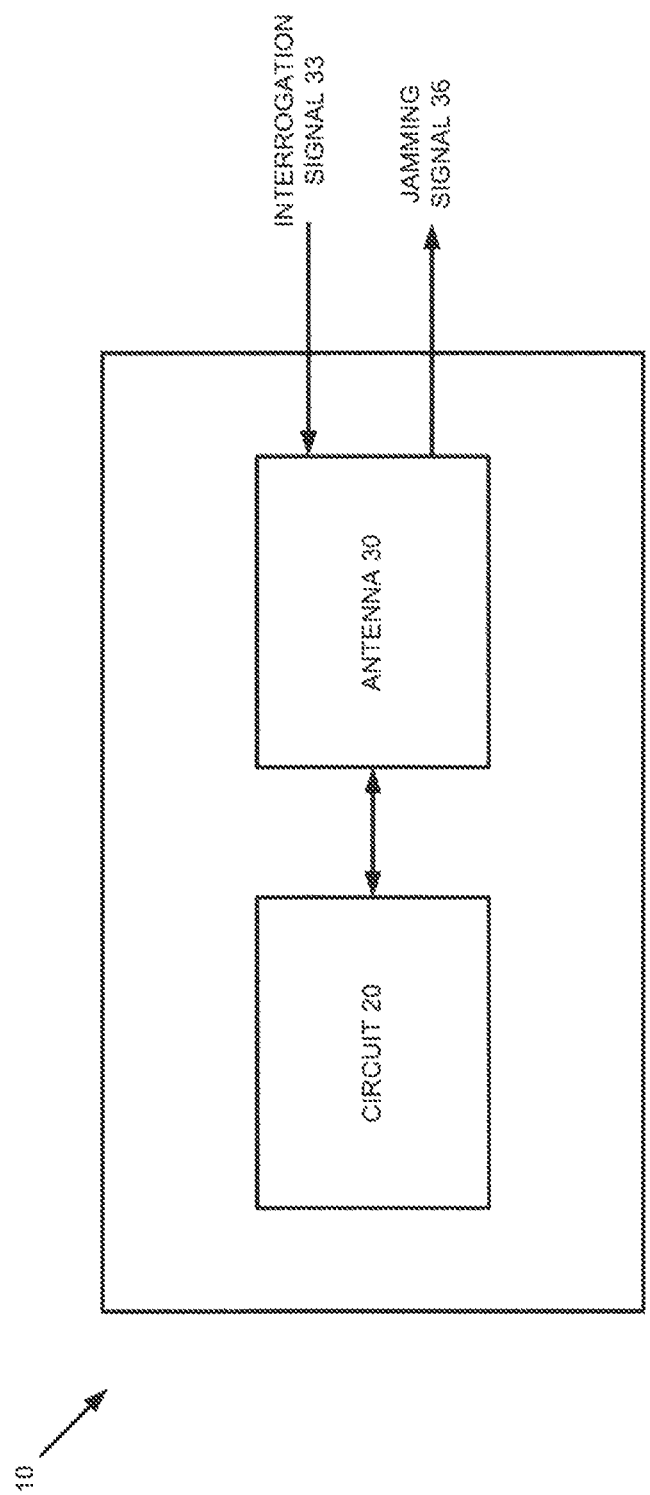

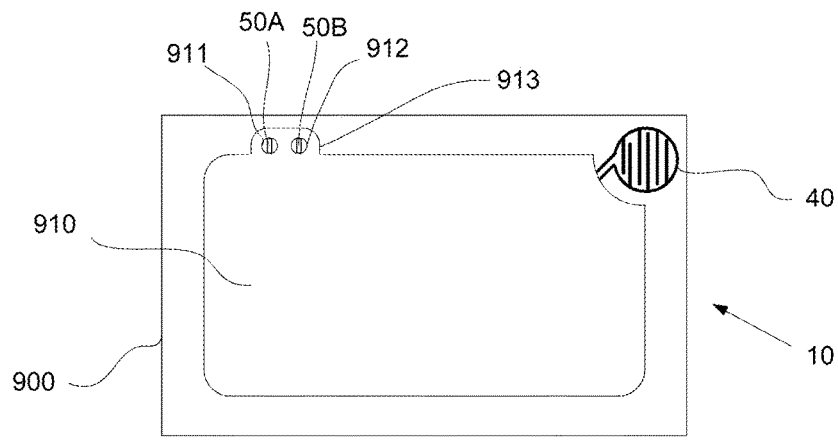
FIGURE 9
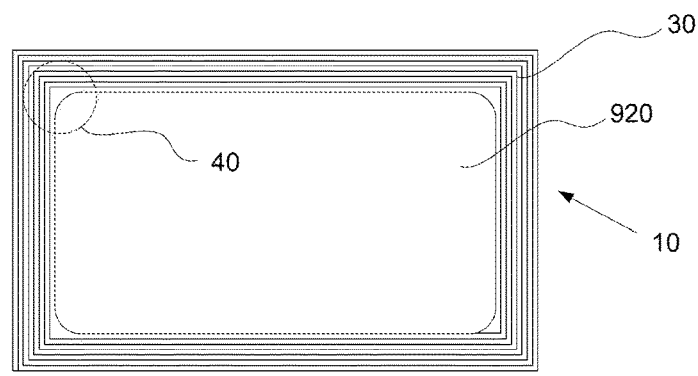
FIGURE 10
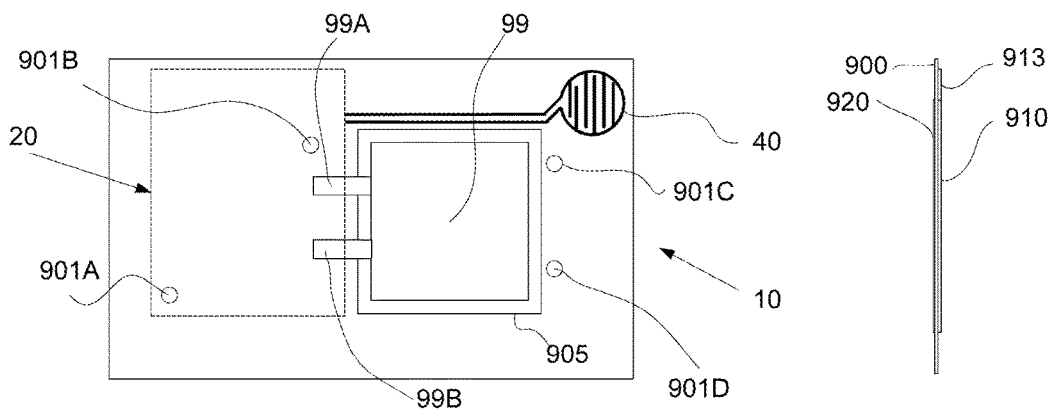
FIGURE 11
FIGURE 12

INHIBITING UNAUTHORISED CONTACTLESS READING OF A CONTACTLESS READABLE OBJECT

CROSS-REFERENCE TO RELATED APPLICATIONS

The present application claims priority from International Application No. PCT/AU2013/001415, filed 5 Dec. 2013, which claims priority to Australian Provisional Patent Application No. 2012905294 filed on 5 Dec. 2012, the content of which is incorporated herein by reference.

TECHNICAL FIELD

The present invention relates to a jamming device, a system, a method and a card carrying object for inhibiting unauthorised contactless reading of contactless readable object.

BACKGROUND

A number of objects include an RFID (Radio Frequency Identification) chip that enable contactless reading of data from a data store. Such objects include contactless payment cards and passports. It is envisaged that more objects are likely to include an RFID chip in order to enable contactless reading of data from a data store.

Whilst RFID enabled objects provide a significant advantage in being able to conveniently read data from the data store in a wireless manner, a significant disadvantage is the security and privacy aspects of such RFID enabled objects, particularly when sensitive information is stored by the RFID chip In particular, it is possible that a person using an RFID reader can skim RFID enabled objects without the knowledge of the owners of the RFID enabled devices. The data skimmed from the RFID enabled objects could be used for illegitimate purposes, such as unauthorised payments or identity theft.

One proposal has been to provide the RFID enabled device with a mechanism to selectively enable the reading of data from the RFID chip, such that if the RFID enabled device is not selectively enabled by a user, data cannot be read in an unauthorised manner. However, the cost of reissuing RFID enabled devices, such as payment cards (credit cards, debits cards, etc) passports, etc, to include such a mechanism is substantially high, particularly if each RFID enabled device which a user owns needs such a mechanism. Therefore, this proposal has not been considered as a realistic solution to preventing unauthorised reads from RFID enabled devices. Thus, is it not anticipated that RFID enabled devices will be redesigned in such manner any time in the near future.

Therefore, there is a need to inhibit unauthorised contactless reading of an RFID enabled object.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

This summary is provided to introduce a selection of concepts in a simplified form that are further described below in the Preferred Embodiments. This summary is not intended to identify key features or essential features of the claimed subject matter, nor is it intended to be used to limit the scope of the claimed subject matter.

In a first aspect there is provided a jamming device for, inhibiting unauthorised contactless reading of an RFID enabled object, wherein the jamming device includes:
  an antenna for receiving an interrogation signal from a reader device;
  a touch sensitive interface; and
  a circuit electrically connected to the antenna and the touch sensitive interface, wherein the circuit is configured to:
    operate in a first mode to generate and emit a jamming signal, via the antenna, in response to receiving the interrogation signal whilst the touch sensitive interface fails to indicate a touch event; and
    operate in a second mode whilst the touch sensitive interface indicates a touch event, wherein the jamming signal is not emitted via the antenna in response to receiving the interrogation signal whilst operating in the second mode.

In certain embodiments, the jamming device has a body having a planar shaped profile having a first face and a second face opposing the first face.

In certain embodiments, the body has a card shaped profile.

In certain embodiments, the body has profile for being tight fittingly received within a pocket of an object, wherein the pocket is sized to tightly receive a credit card.

In certain embodiments, the body has a length between about 80 mm and 90 mm and a width of between about 50 mm to 60 mm.

In certain embodiments, the length of the body is about 86 mm and the width of the body is about 54 mm.

In certain embodiments, the jamming device has a thickness between about 1 mm to 3 mm.

In certain embodiments, the jamming device has a thickness of about 2 mm.

In certain embodiments, the body is a board which provides the circuit, the antenna and the touch sensitive interface.

In certain embodiments, the antenna is provided on the first face of the board and the touch sensitive interface is provided on a second face of the board.

In certain embodiments, the touch sensitive interface is located at an edge section of the first face of the board and a majority of the antenna is located at the edge section of the second face of the board.

In certain embodiments, the antenna and touch sensitive interface are printed on the board and wherein the circuit is provided on or in the board.

In certain embodiments, the jamming device includes at least one cover for covering at least part of the circuit on the board.

In certain embodiments, the jamming device includes a battery electrically connected to the circuit, wherein the at least one cover covers the battery.

In certain embodiments, the board includes a cut-out section which the battery partially protrudes therethrough or is at least partially located therein.

In certain embodiments, the at least one cover includes a first cover and a second cover, wherein the first cover covers at least part of a first face of the board and the second cover covers at least part of a second face of the board such that the battery is covered by the first and second covers.

In certain embodiments, the battery is an thin cell battery.

In certain embodiments, the battery is a Lithium-ion battery.

In certain embodiments, the at least one cover does not cover a majority of the antenna provided on the board.

In certain embodiments, a majority of the antenna loops about a periphery of the at least one cover.

In certain embodiments, the circuit includes an integrated circuit configured to:
  generate or retrieve jamming data in response to the antenna receiving the interrogation signal; and
  modulate the jamming data with the interrogation signal for generating the jamming signal.

In certain embodiments, the circuit includes one or more visual indicators which are controllable by the integrated circuit to indicate at least one of:
  the circuit operating in the second mode; and
  the circuit detecting the interrogation signal whilst operating in the first mode.

In certain embodiments, the one or more indicators includes a second mode indicator controllable by the integrated circuit for indicating whether the circuit is operating in the second mode.

In certain embodiments, the second mode indicator is a light emitting diode.

In certain embodiments, the second mode indicator is controllable to flash whilst the circuit is operating in the second mode.

In certain embodiments, the one or more indicators include a jamming indicator controllable by the integrated circuit for indicating transmission of the jamming signal.

In certain embodiments, the jamming indicator is a light emitting diode.

In certain embodiments, the jamming indicator is controllable to flash to indicate transmission of the jamming signal.

In certain embodiments, the touch sensitive interface is one of:
  a capacitive sensing interface; and
  a resistive sensing interface.

In certain embodiments, the circuit includes an interrogation signal detector electrically connected to the antenna and the integrated circuit, wherein the interrogation signal detector is configured to determine whether a signal received by the antenna has one or more characteristics indicative of the interrogation signal, wherein in response to a positive determination, the interrogation signal detector transfers a signal to the integrated circuit indicative of the detected interrogation signal.

In certain embodiments, the interrogation signal detector is configured to detect if the signal received meets or exceeds a threshold indicative of the interrogation signal.

In certain embodiments, the jamming device is configured to inhibit the reading of the RFID enabled object which is located within a jamming proximity of about 3 cm of the jamming device.

In certain embodiments, the jamming device is configured to inhibit the reading of the RFID enabled object which is located within a jamming proximity of about 2 cm of the jamming device.

In certain embodiments, the jamming device configured to inhibit reading of multiple RFID enabled objects within the jamming proximity of the jamming device.

In certain embodiments, the jamming device includes a plurality of orthogonal antennas.

In a second aspect there is provided a device for inhibiting contactless reading of an RFID enabled object, wherein the device includes:
  an antenna for receiving an interrogation signal from a reader device;
  an integrated circuit configured to:
    generate or retrieve jamming data in response to the antenna receiving the interrogation signal; and
    modulate the jamming data with the interrogation signal to generate a jamming signal which is emitted via the antenna to inhibit the reading device reading data from the RFID enabled object; and
  a touch sensitive interface in electrical communication with the integrated circuit;
  wherein the integrated circuit operates in a first mode to generate and emit a jamming signal, via the antenna, in response to receiving the interrogation signal whilst the touch sensitive interface fails to indicate a touch event, and the integrated circuit operates in a second mode whilst the touch sensitive interface indicates a touch event, wherein the jamming signal is not emitted via the antenna in response to receiving the interrogation signal whilst operating in the second mode.

In certain embodiments, the device includes a visual indicator which are controlled by the integrated circuit to indicate at least one of:
  the device operating in a second mode; and
  the device detecting the interrogation signal whilst operating in the first mode.

In certain embodiments, the device includes a communication module to wirelessly transfer a detection of the interrogation signal to a mobile computing device.

In certain embodiments, the communication module is a Bluetooth communication module.

In certain embodiments, the device includes a demodulator to demodulate the interrogation signal to obtain interrogation request data.

In certain embodiments, the device transfers detection data indicative of the interrogation request data to the mobile computing device to notify the mobile computing device of the detection.

In certain embodiments, the touch sensitive interface is one of:
  a capacitive sensing interface; and
  a resistive sensing interface.

In certain embodiments, the device includes an interrogation signal detector electrically connected to the antenna and the integrated circuit, wherein the interrogation signal detector is configured to determine whether a signal received by the antenna has characteristics indicative of the interrogation signal, wherein in response to a positive determination, the interrogation signal detector transfers a signal to the integrated circuit indicative of the detected interrogation signal.

In certain embodiments, the interrogation signal detector is configured to detect if the signal received meets or exceeds a threshold indicative of the interrogation signal, wherein in response to a positive detection the interrogation signal detector transfers a signal to the integrated circuit indicative of the detected interrogation signal.

In certain embodiments, the device has a card profile.

In certain embodiments, the touch sensitive interface is located adjacent the perimeter of the device.

In certain embodiments, the device includes a plurality of orthogonal antennas.

In a third aspect there is provided a system for inhibiting contactless reading of an RFID enabled object, wherein the system includes:
  the device according to the first aspect; and
  a computer program for execution by a mobile computing device, wherein the mobile computing device is in communication with the device and is configured by the computer program to receive detection data from the communication module of the device, and generate a prompt in response to receiving the detection data to warn the user of the detected interrogation signal.

In certain embodiments, the communication module is a Bluetooth communication module.

In certain embodiments, the device includes a demodulator to demodulate the interrogation signal to obtain interrogation request data.

In certain embodiments, the device transfers the detection data indicative of the interrogation request data to the mobile computing device to notify the mobile computing device of the detection.

In certain embodiments, the detection data received from the device is indicative of a timestamp of the detection.

In certain embodiments, the mobile computing device, under control of the computer program, appends a timestamp to the received detection data indicative of a time when the mobile computing device was notified of the detection.

In certain embodiments, the mobile computing device, under control of the computer program, obtains a geographical location of the mobile computing device once notified of the detection and appends the geographical location to the detection data.

In certain embodiments, the mobile computing device, under control of the computer program, stores the detection data in memory of the mobile computing device.

In certain embodiments, the mobile computing device, under control of the computer program, transfers the detection data to a server processing system for recordal in a data store.

In certain embodiments, the system includes the server processing system.

In certain embodiments, the system includes a plurality of devices.

In certain embodiments, the data store has stored therein detection data from the plurality of devices.

In certain embodiments, the server processing system processes the detection data received from the plurality of device to determine one or more areas of unauthorised interrogation hotspots.

In certain embodiments, the server processing system transfer hotspot data indicative of the one or more areas of unauthorised interrogation hotspots to at least some of the plurality of devices, wherein each mobile computing device is configured to determine a current location of the mobile computing device, wherein if the current location is within one of the hotspots the mobile computing device prompts the user with a warning.

In certain embodiments, the system includes the mobile computing device.

In a fourth aspect there is provided a card carrying object for carrying a one or more cards, wherein the card carrying object includes:
  a device for inhibiting contactless reading of an RFID enabled object, wherein the device includes:
    an antenna for receiving an interrogation signal from a reader device;
    an integrated circuit configured to:
      generate or retrieve jamming data in response to the antenna receiving the interrogation signal; and
      modulate the jamming data with the interrogation signal to generate a jamming signal which is emitted via the antenna to inhibit the reading device reading data from the RFID enabled object; and
    a touch sensitive interface located on a surface of the card carrying object to selectively operate the device in a first mode, wherein the jamming signal is emitted in response to receiving the interrogation signal whilst the touch sensitive interface fails to sense a touch event, and a second mode, wherein the jamming signal is not emitted in response to receiving the interrogation signal whilst the touch sensitive interface senses a touch event;

In certain embodiments, the card carrying object is one of:
  a purse; and
  a wallet.

In another aspect there is provided a method of inhibiting unauthorised contactless reading of an RFID enabled object, wherein the method includes:
  locating the jamming device according to any one of claims 1 to 33 adjacent one or more RFID enabled objects thereby inhibiting unauthorised contactless reading of the one or more RFID enabled objects whilst the circuit operates in the enabled mode; and
  touching the touch interface of the jamming device to enable reading of the one or more RFID enabled objects.

In certain embodiments, the method includes locating the jamming device within a pocket of a wallet, wherein the wallet carries therein and adjacent to pocket the one or more RFID enabled objects.

Other aspects and embodiments will be appreciated through the detailed description.

BRIEF DESCRIPTION OF THE FIGURES

Example embodiments should become apparent from the following description, which is given by way of example only, of at least one preferred but non-limiting embodiment, described in connection with the accompanying figures.

FIG. 1 illustrates a block diagram of an example of the device;

FIG. 9 illustrates a front view of an example of the jamming device;

FIG. 10 illustrates a rear view of the jamming device of FIG. 9;

FIG. 11 illustrates a front view of the jamming device with the front cover removed;

FIG. 12 illustrates side view of the jamming device of FIG. 9;

DETAILED DESCRIPTION OF EMBODIMENTS

Figure 2A:
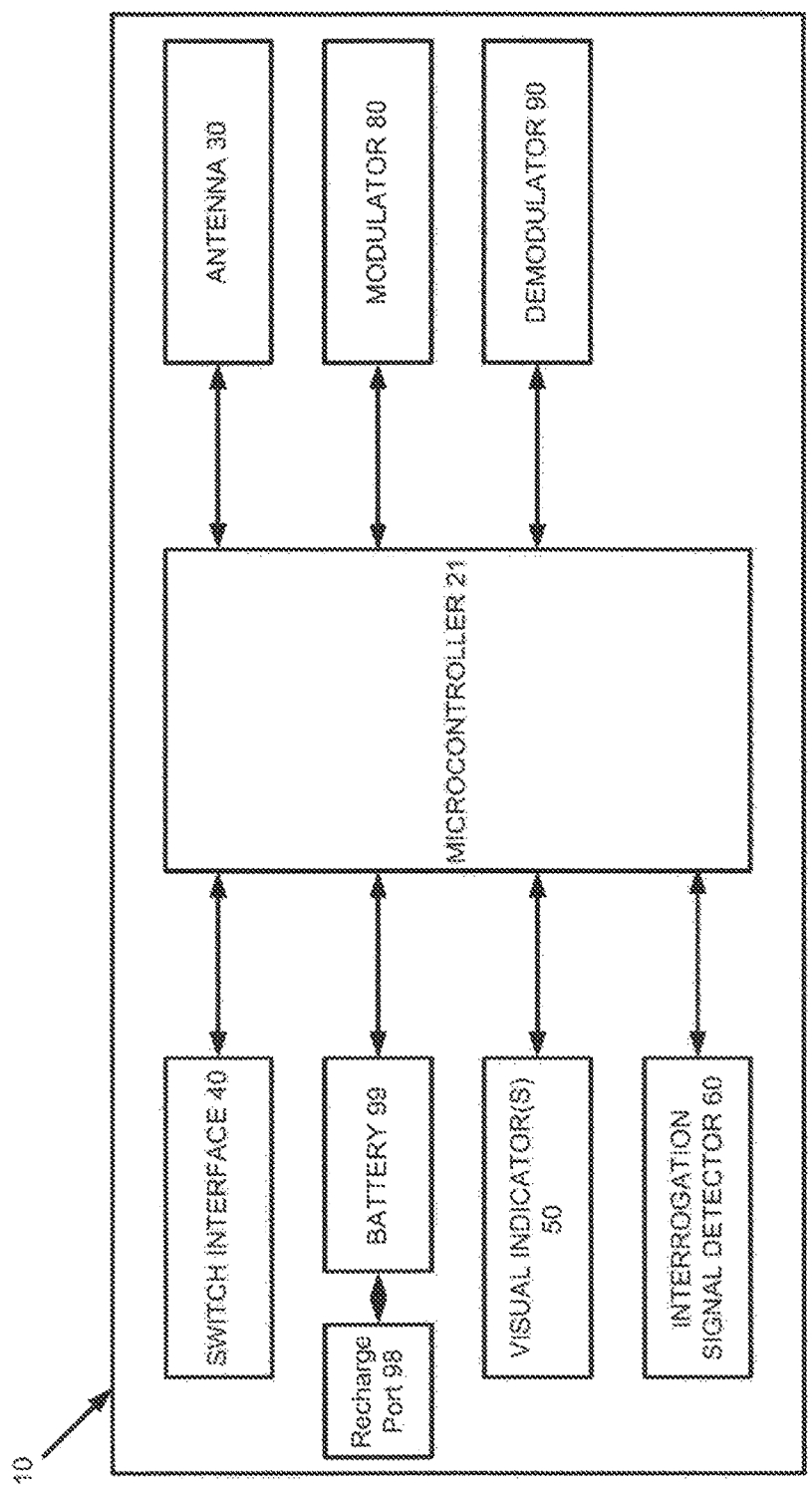
FIG. 2A illustrates a block diagram of another example of the device.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Figure 6:
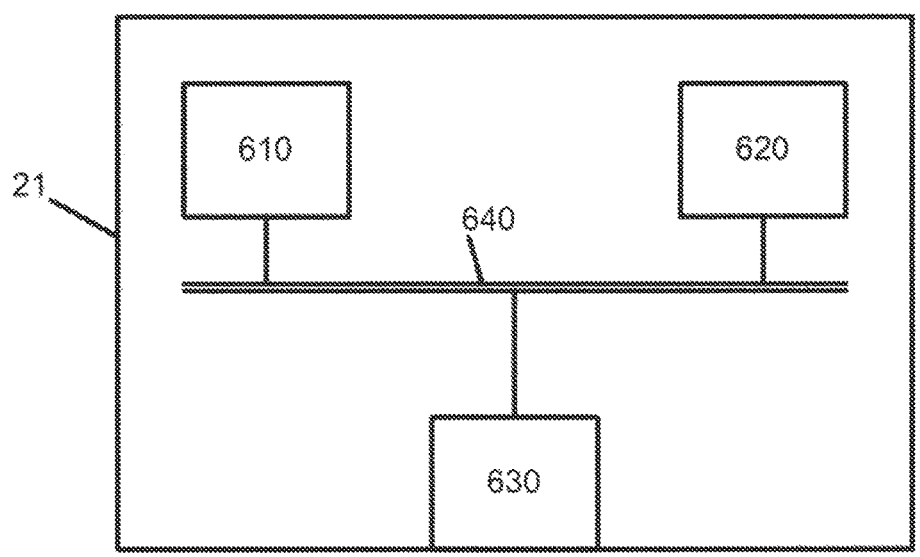
FIG. 6 illustrates a schematic of a block diagram of a processing system.

Referring to FIG. 1 there is shown a block diagram of a jamming device 10 for inhibiting unauthorised contactless reading of an RFID enabled object. In particular, the jamming device 10 includes an antenna 30 electrically connected to a circuit 20. The circuit 20 is generally provided in the form of a microcontroller 21 in electrical connection with a number of sub-circuits as will be described in more detail herein. Referring to FIG. 6 there is shown a block diagram of a processing system suitable for use as the microcontroller 20. In particular, the processing system 600 includes a processor 610, memory 620 and an interface 630 coupled together via a bus 640.

The jamming device 10 is configured to be positioned adjacent one or more contactless readable objects, such as RFID enabled objects. For the sake of clarity, the example herein will discuss the application of the jamming device 10 in relation to an RFID enabled object.

Figure 13:
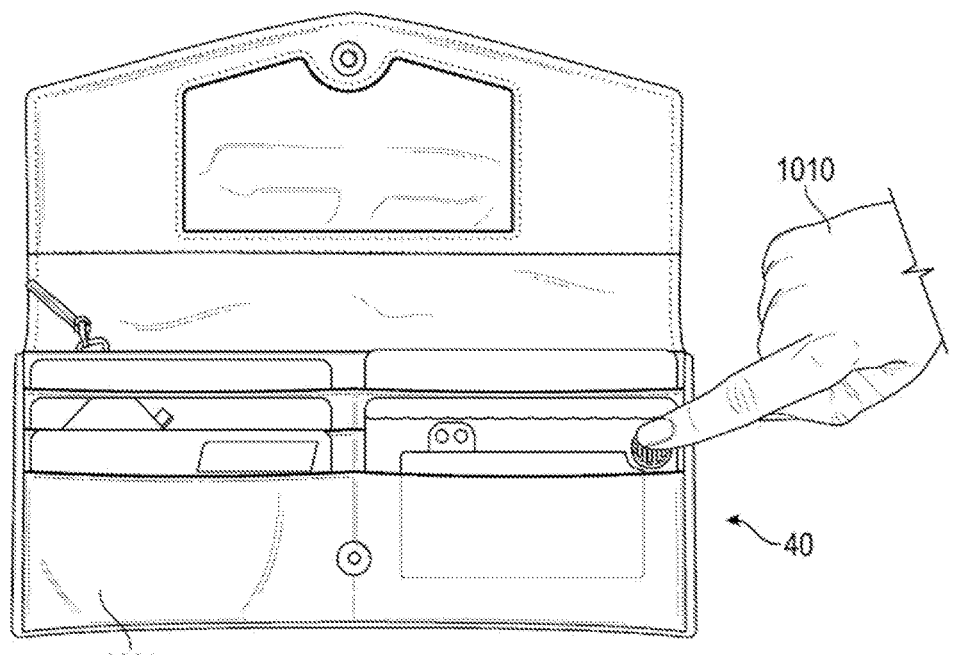
FIG. 13 illustrates the jamming device of FIG. 9 located in a purse.
Figure 14:
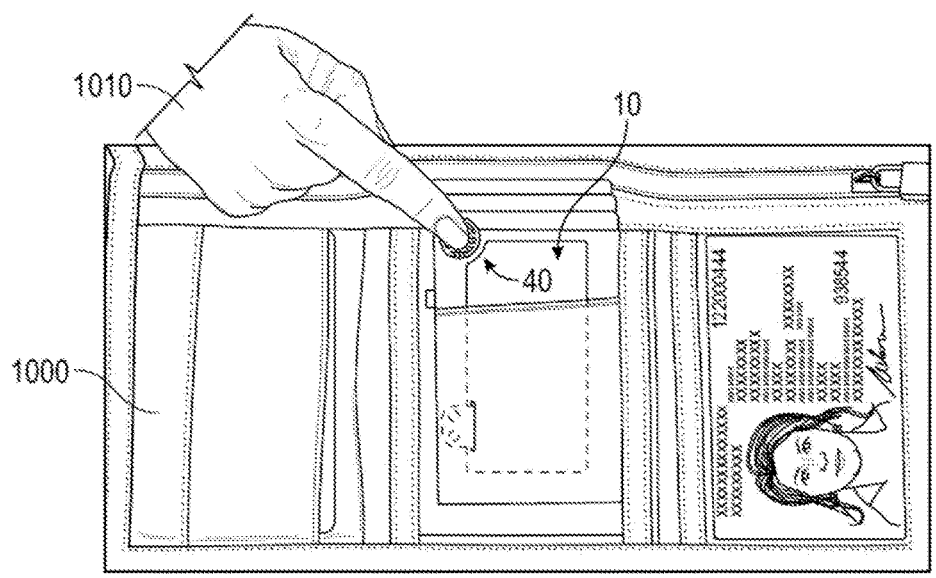
FIG. 14 illustrates the jamming device of FIG. 9 located in a wallet.
Figure 15:
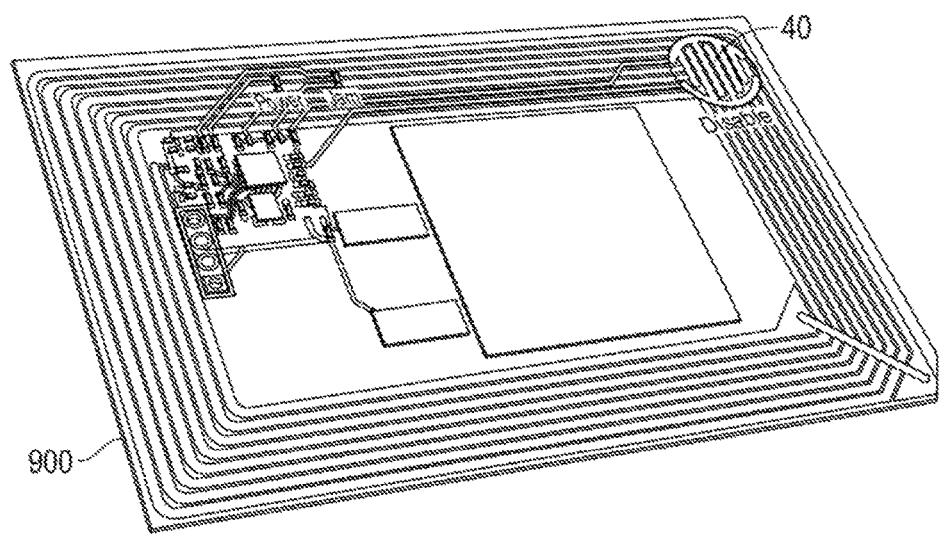
FIG. 15 illustrates a perspective view of an example of the board of jamming device of FIG. 9 with the front cover removed.

For example, the jamming device 10 may be provided in the form of a flat profiled card, as shown in FIG. 9, which can be positioned in a pocket of card carrying object such as a wallet or purse adjacent one or more payment cards contained in neighbouring pockets of the purse or wallet, as shown in FIG. 13 or 14. In specific embodiments, the jamming device 10 is designed to be located within a proximity of approximately 3 centimeters, and more specifically 2 centimeters, of one or more RFID enabled objects. The jamming device 10 can be positioned in front or behind the RFID enabled object(s) relative to a reader device emitting an interrogation signal.

When a reader device emits an interrogation signal 33 to read data from the RFID enabled object, the jamming device 10 is closely coupled electrically with a transmitter of the reader device. The antenna 30 of both the RFID enabled object and the jamming device 10 receive the interrogation signal 33 and generate an electrical current. The antenna 30 is preferably provided in the form of an electromagnetic coil or loop to generate the electrical current from the received signal.

In response to the generated electrical current, the circuit 20 of the jamming device 10 generates a jamming signal. In one form, the integrated circuit generates or retrieves, jamming data. The integrated circuit 21 then modulates the jamming data with the interrogation signal 33. A jamming signal 36, based on the modulated jamming data, is then emitted via the antenna 30 which is received by the reader device. The reader device detects the jamming signal 36 as well as a response signal from the RFID enabled object. It has been found that the reader device is unable to successfully read the response signal emitted by the nearby RFID enabled object due to the jamming signal 36 being emitted.

As mentioned above, the microcontroller 21 is configured to modulate the interrogation signal 33 received from the reader device with the jamming data to generate the jamming signal 36. It will be appreciated that the microcontroller 21 may perform the modulation process or optionally control a modulator module 80 to perform the modulation process. In this example, the read signal received from the reader has a frequency of approximately 13.56 MHz. The microprocessor can include an oscillator, or is coupled to an oscillator module, which generates an oscillator signal, for example an 847.5 KHz signal. The interrogation signal 33 is modulated with the oscillator signal and the jamming data to generate the jamming signal 36 which is emitted by the antenna 30 of the jamming device 10 to inhibit the reader device reading data from the nearby RFID enabled object. It will be appreciated that other frequencies can also be used.

Referring to FIG. 2A there is shown a further block diagram of an example of the device 10. In particular, the device 10 includes the antenna 30 electrically connected to the microcontroller 21.

Figure 3:
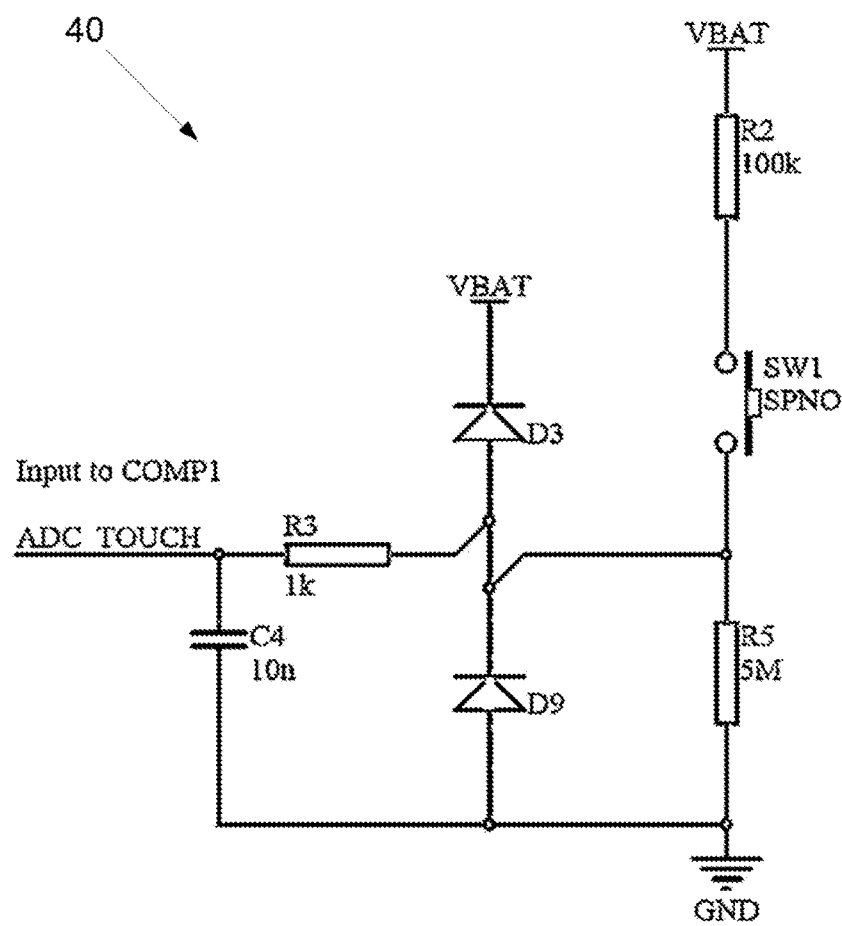
FIG. 3 illustrates a schematic of an example of a switch interface of the device.

In addition, the device of FIG. 2A includes a switch interface 40 which is electrically connected to the microcontroller 21. The switch interface 40 is preferably provided in the form of a touch sensitive interface that senses a user touching the touch sensitive component of the touch sensitive interface 40. The touch sensitive interface 40 can be a capacitive or resistive sensing interface, wherein the microcontroller 21 operates in a second mode when the capacitance or resistance sensed by the touch sensitive interface is indicative of human body capacitance or resistance. An electrical schematic of an example of the touch sensitive interface 40 is illustrated in FIG. 3. In particular, the touch sensitive interface 40 operates using a comparator circuit to sense if a user is touching the touch sensitive component of the touch sensitive interface 40. In the event that a user touches the touch sensitive interface 40, a signal is transferred to the microcontroller 21 from the touch sensitive interface 40 indicative of the user touching the interface 40. Whilst the touch sensitive interface indicates to the microcontroller 40 that the user is touching the switch interface 40, the microcontroller 21 is disabled from generating a jamming signal 36 despite an interrogation signal 33 being received by the antenna 30.

For example, in the event that the jamming device 10 is embodied as a card as shown in FIGS. 13 and 14 that is located in a wallet or purse 1000, the user can touch the touch sensitive interface 40 with a finger of their hand 1010 to disable the jamming device 10 so that the user can deliberately allow the reader device to read data from a RFID enabled payment card contained in the wallet or purse 1010. Thus the user can selectively disable the jamming device 10 via interaction with the switch interface 40 when required. In the event that the user is not touching the switch interface 40, the microcontroller 21 operates in an enabled such that the jamming signal 36 can be emitted if an interrogation signal 33 is detected.

As shown in FIG. 9, the switch interface 40 can be located within an edge section of the card adjacent the perimeter of the jamming device 10 such that when the jamming device 10 is located in a pocket of the wallet or purse 1000, the switch interface 40 protrudes from the pocket to allow the user to easily touch the switch interface 40 and disable the device 10 whilst located within the wallet or purse 1000 as shown in FIGS. 13 and 14.

As shown in FIG. 2A, the device also includes an one or more electrically controllable visual indicators. In one form, the visual indicators can be controlled to indicate a second mode of the jamming device 10. In particular, the visual indicator 50 can be provided in the form of one or more Light Emitting Diodes (LEDs) that are electrically connected to the microcontroller 40. When the microcontroller 21 is disabled via user interaction with the switch interface 40, the microcontroller 20 actuates the one or more LEDs 50 to indicate the second mode of the jamming device 10. In particular, a second mode indicator flashes when the jamming device 10 is disabled and a jamming indicator flashes indicating the transmission of the jamming signal.

Figure 4:
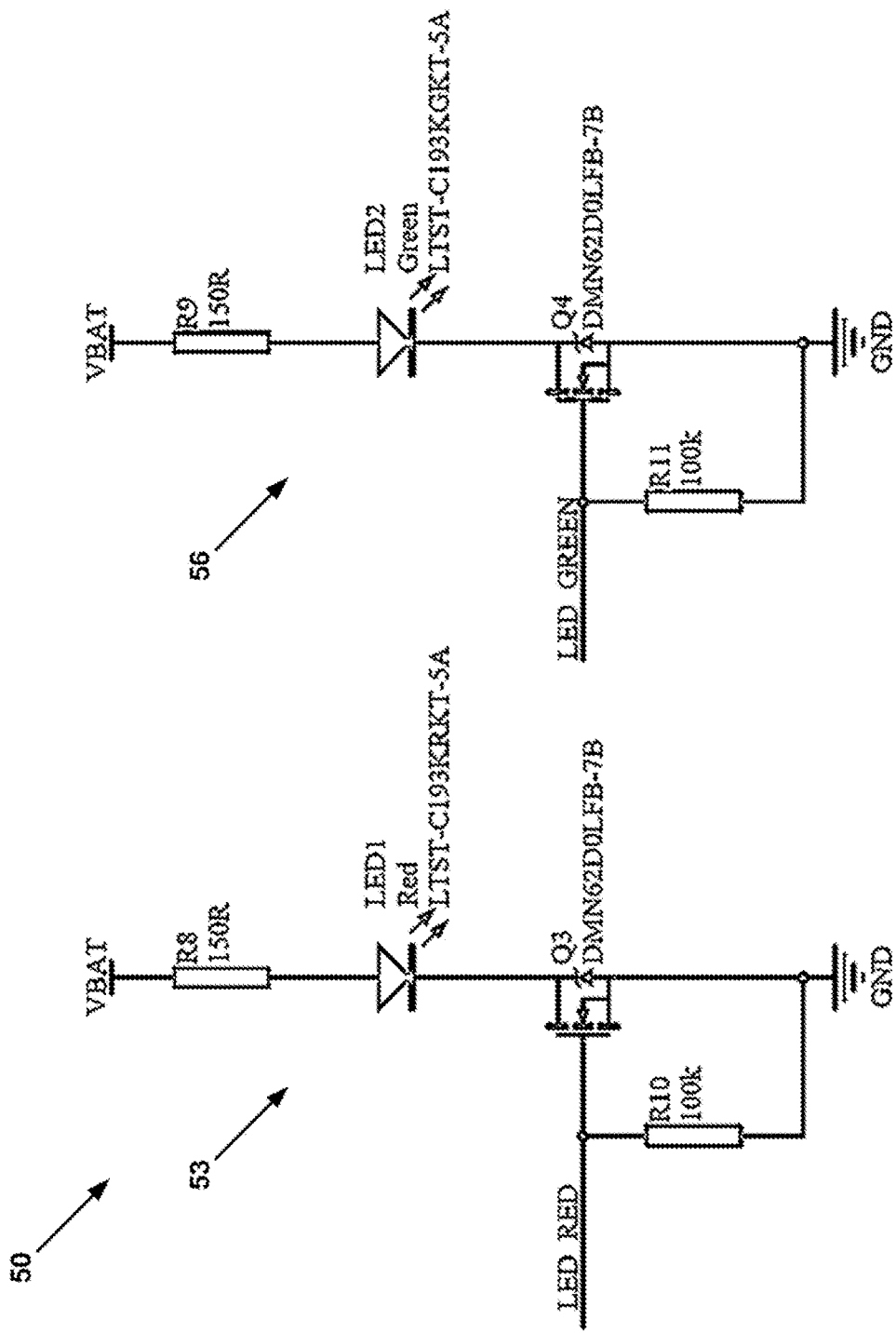
FIG. 4 illustrates a schematic of components of a visual indicator of the device.

In additional or alternative forms, the microcontroller 20 actuates one or more LEDs when the antenna 30 generates a current indicative of a detected interrogation signal whilst operating in the first mode. In one form, the visual indicator 50 includes two LED controllable circuits which are electrically connected to the microcontroller 21 for selective actuation, as shown in the schematics of FIG. 4 and in the schematic of the system shown in FIG. 7 wherein a first LED emits an green light when the jamming device 10 operates in a second mode, and a second LED emits a red light when the antenna 30 generates a current indicative of a detected interrogation signal whilst operating in the first mode. However, it will be appreciated that the visual indicator 50 may utilise a single component may be used to indicate both events. For example, the jamming device 10 may, include a single LED that is a multi-colour LED that emits multiple colours of light. For example, the multi-colour LED may emit a green colour when the microcontroller is second and red colour when the antenna 30 generates a current indicative of a detected interrogation signal whilst operating in the first mode.

Figure 5:
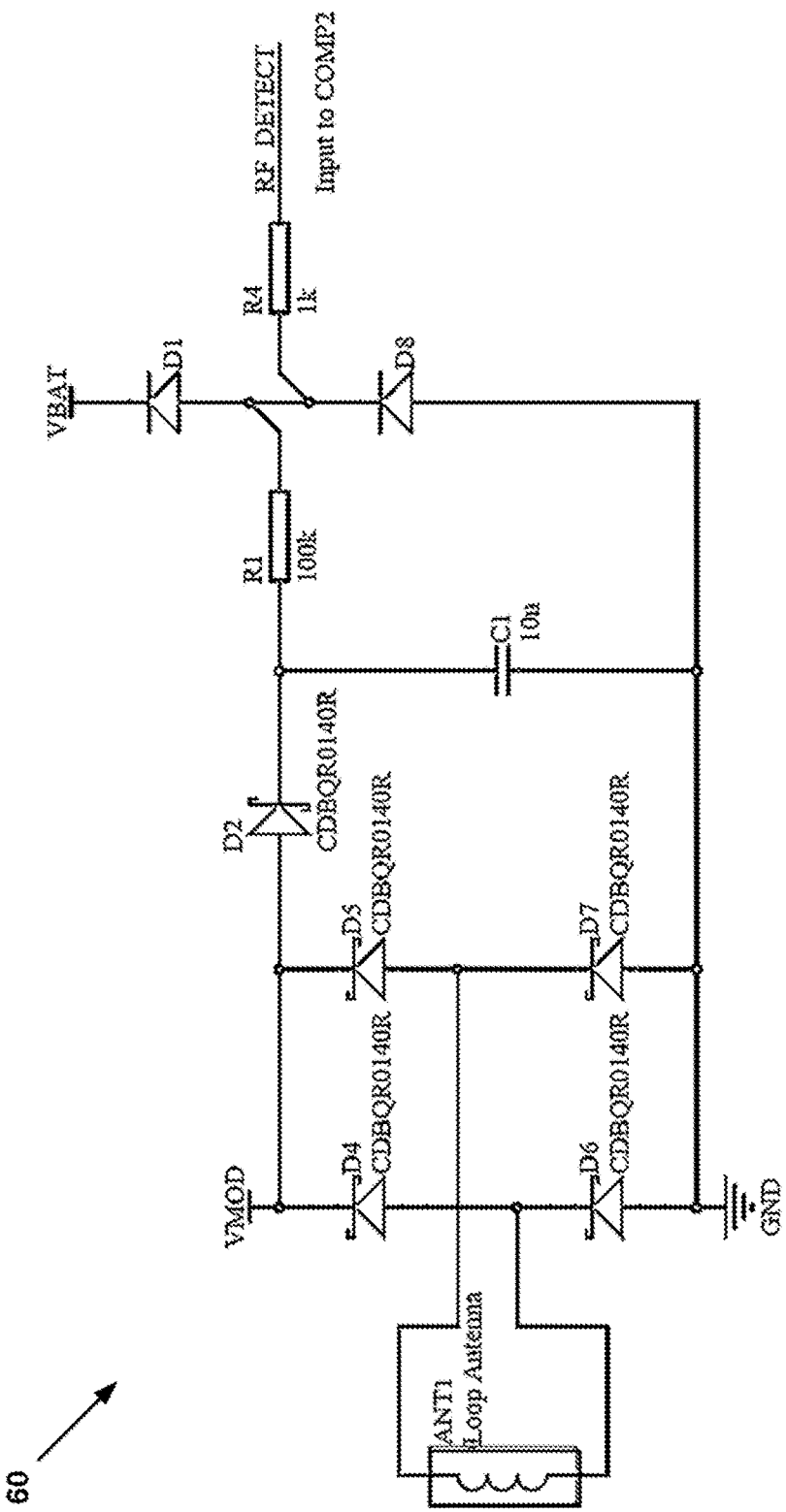
FIG. 5 illustrates a schematic of an example of an interrogation signal detector of the device.

The jamming device 10 of FIG. 2A preferably includes an interrogation signal detector 60 to detect an interrogation signal 33 from a reader device. The interrogation signal detector 60 can be configured to determine whether a signal received by the antenna 30 has one or more characteristics indicative of the interrogation signal. In particular, a schematic of an example of the interrogation signal detector 60 is shown in FIG. 5 which determines whether the current generated by the antenna 30 in response to the a particular signal exceeds a threshold indicative of an interrogation signal. The threshold may be a current threshold, a voltage threshold or a power threshold. As such, the interrogation signal detector 60 operates as a filter to actuate the microcontroller 21 to control the generation of the jamming signal in response to a genuine interrogation signal.

The jamming device 10 of FIG. 2A preferably includes an electrical power source 99. In particular, the electrical power source 99 is an electrical battery. The electrical battery 99 may be embedded or encased within the jamming device 10 such that it cannot be removed. However, in other embodiments of the jamming device 10, the battery 99 is replaceable. In certain embodiments, the jamming device 10 includes a recharging interface 98 electrically coupled to the battery 99 so as to allow the battery to be recharged. The recharging interface 98 may couple to a micro USB electrical cable or similar electrical power cable to enable the battery to be recharged. In embodiments where the jamming device 10 includes the battery 99, the device may operate as an active device or a semi-active device. In other embodiments, the jamming device 10 can be a passive device where no battery is provided.

The jamming device 10 of FIG. 2A can also be configured to demodulate the interrogation signal 33. In particular, the microprocessor 21 can perform the demodulation process, or optionally the microcontroller 21 can control a demodulator module 90 to perform the demodulation process upon the interrogation signal. The demodulator 90 can be used to demodulate the interrogation signal 33 received from the reader device to obtain interrogation request data. The interrogation request data may be indicative of a number various fields associated with the interrogation to read the data, such as an identity of the reader device. The microcontroller 20 can store an interrogation record indicative of the interrogation request data in non-volatile memory 620 of the microcontroller 20 as shown in FIG. 6. The microcontroller 20 can additionally record a time field such as a time stamp indicative of when the interrogation request was detected.

Figure 2B:
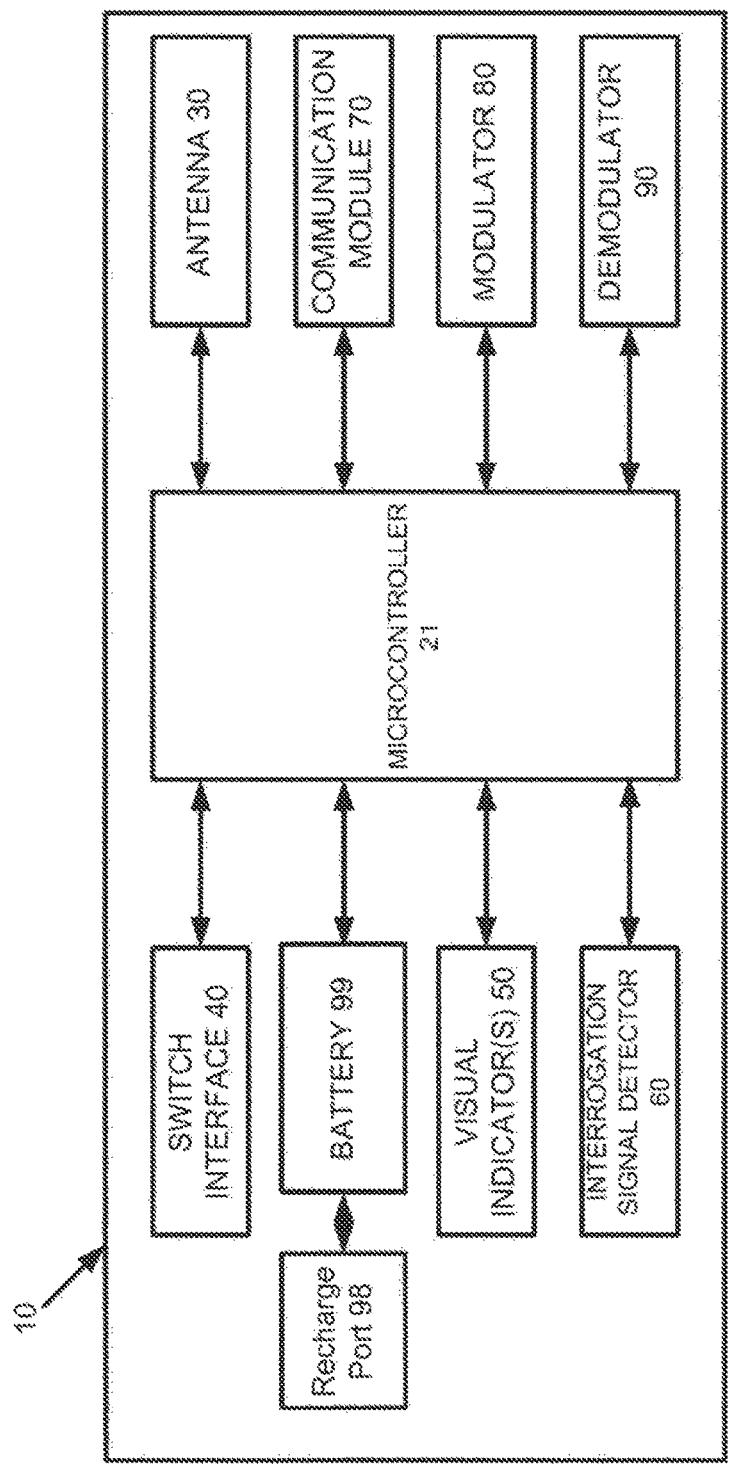
FIG. 2B illustrates a block diagram of another example of the device.
Figure 8:
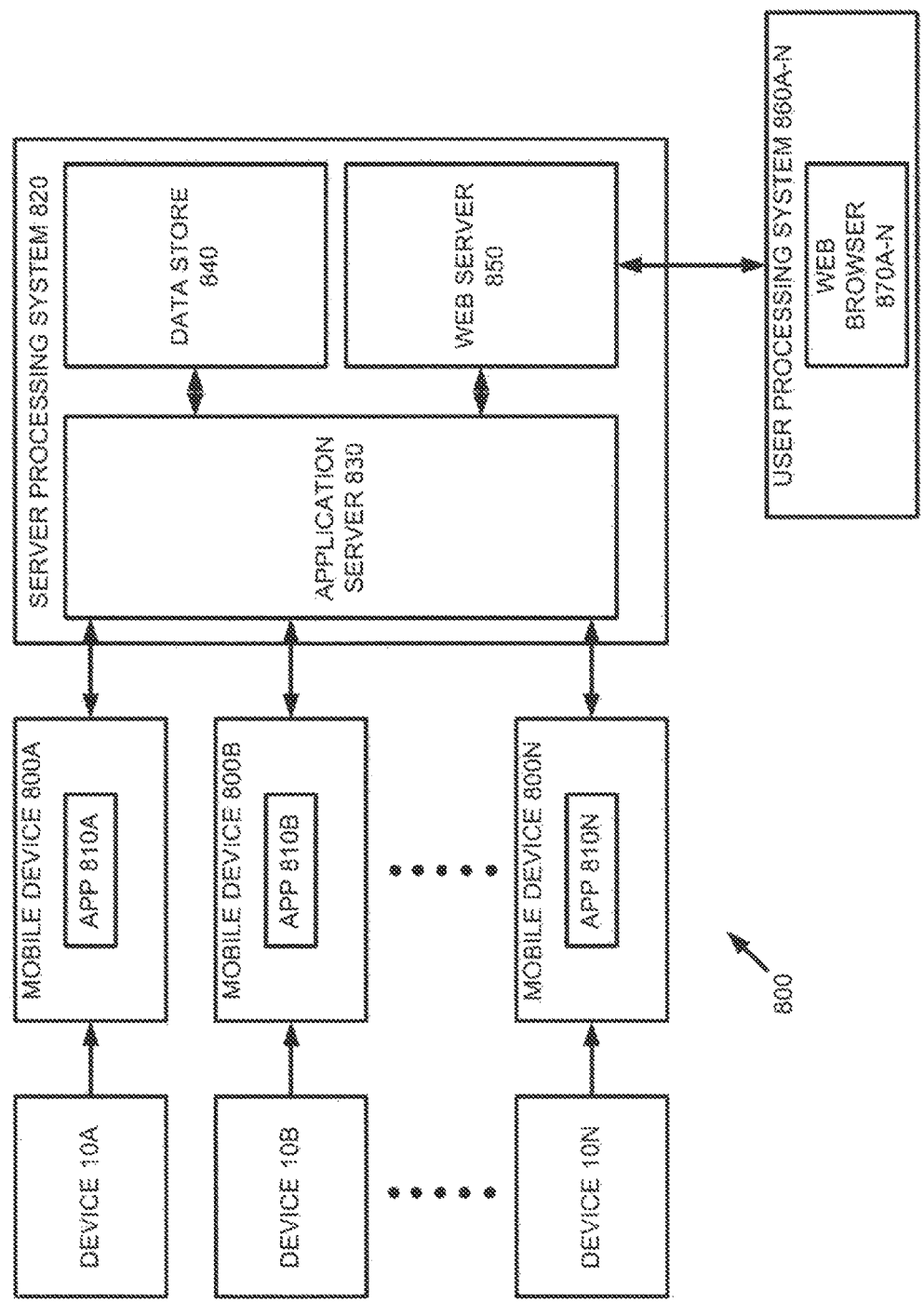
FIG. 8 illustrates a block diagram of a system including the device.

Referring to FIG. 2B showing an alternate example of the jamming device 10, the jamming device 10 can also include a communications module 70 to enable the device to communicate with one or more processing systems. The communications module 70 may be a wireless communication module. In one form, the wireless communication module 70 is a Bluetooth™ communication module that enables the jamming device to communicate with a Bluetooth™ enabled device. In specific forms, the jamming device 10 is able to communicate via the wireless communication module 70 with a mobile computing device 800 such as a mobile telephone, laptop or tablet as shown in FIG. 8. The mobile computing device 800 is generally carried or nearby by the user of the jamming device 10, such that additional functions can be performed by the mobile computing device 800 in response to the detection. In particular, the mobile computing device 800 executes a computer application 810 in order to control the communication between the mobile computing device 800 with the jamming device 10.

Figure 7:
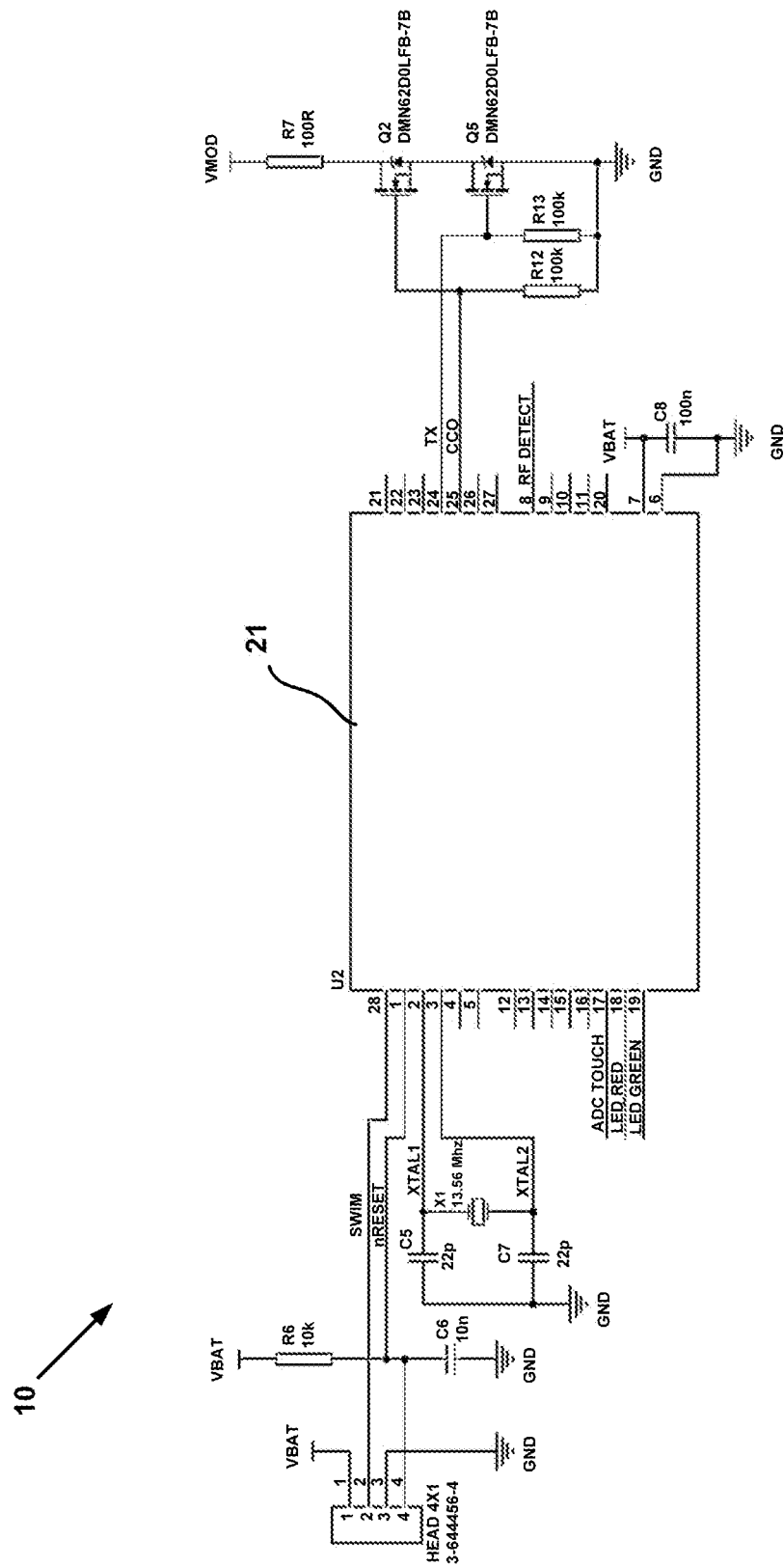
FIG. 7 illustrates a schematic of a microcontroller of the device.

As shown in FIG. 7, the microcontroller 21 can be electrically connected to each component of the device via a number of input and output pins of the microcontroller. The microcontroller 21 can have a computer program stored in non-volatile memory 620 which controls the operation of microcontroller 21 in response to various events.

Referring to FIG. 8 there is shown a block diagram of a system 800 including a plurality of jamming devices 10A-10N. In particular, the microcontroller of each jamming device 10 is configured to transfer detection data to a respective mobile computing device 810 via the respective communication module 70 in response to the jamming device 10 detecting an interrogation signal 33 from a reader device whilst operating in the first mode. The detection data transferred by the jamming device 10 to the mobile computing device 810 may simply be indicative of a detection of an interrogation signal 33. Optionally, the detection data may also be indicative of information extracted by the demodulator 90 from the interrogation signal 33.

In response to the receiving the detection data, the application 810 can control the mobile computing device 800 to notify the user of the detection. For example, the display of the mobile computing device 800 may display a prompt indicative of the detection. Additionally or alternatively, the application 810 may emit an audio prompt via the speaker of the mobile computing device 800. Additionally or alternatively, the application 810 may control a vibration module of the mobile computing device 800.

In particular embodiments, in response to the receiving the detection data, the application 810 of the mobile computing device 800 stores the detection data in a data storage medium. The application 810 may store the data in the memory 620 of the mobile computing device 800. Additionally or alternatively, the application 810 transfers the detection data to a remote device 820, wherein the remote device 820 stores the detection data in a data store 840. For example, the application 810 can transfer the detection data to an application server 830 hosted by a remote processing system 820, such as a server processing system, in data communication with the mobile computing device 800 via a network. The application server 830 stores the detection data in a data store 840 such as a database.

The application 810 executed by the mobile computing device 800 can append additional fields of data to the detection data for storage in the data store 840. In particular, in the event that the detection data is not indicative of a time of the detection, the application 810 can control the mobile computing device 800 to associate a time field, such as a time-stamp, indicative of the time when the mobile computing device 800 was notified of the detection. Additionally or alternatively, the application 810 can control the mobile computing device 800 to obtain a location of the mobile computing device 800, such as a GPS coordinate, when the mobile computing device 800 was notified of the detection.

The user of the mobile computing device 800 can interact with the application 810 to review the detection reported by the jamming device 10. The user is able to review various fields for at least some of the detections made the jamming device 10 such as the time and location of the detection.

As shown in FIG. 8, the application server 830 can be in communication with a plurality of mobile computing devices 800A-800N associated with a plurality of devices 10A-10N. In this embodiment, the database 840 has stored therein detection data from a community of users. A respective user of a mobile computing device 800 can interact with the application 810 to be presented with data indicative of at least some of the detections from the community. The application server 830 can transfer an indication of at least some of the detections by the community stored in the database 840. For example, the user may request an indication of detections within a particular geographical region within a particular timeframe. The application server 830 may query the community of detections based on the location and time fields stored with each detection record. Data indicative of geographically and temporally relevant detections may then be transferred to the mobile computing device 800 and presented via the application 810. The community of detections may be presented in the form of a map indicative of the geographical area including annotation data indicative of one or more relevant detections.

The application server 830 can optionally determine, based on the community of detections, one or more geographical areas where high rates of unauthorised reads are detected. Such areas are referred to as "hotspots". The application server 830 can transfer data indicative of these geographical areas to the mobile computing devices 800. Each application 810 can periodically request the respective mobile computing device 800 to determine the current location, such as a GPS coordinate. In the event that the current location falls within one of the geographical areas associated with high rates of unauthorised read detections, the application 810 can warn the user. For example, the application 810 may control the mobile computing device 800 to generate a visual, audio and/or vibratory prompt to warn the user. The user may then react to the warning and move out of the geographical area accordingly to minimise the risk of an authorised read.

The server processing system 820 can also include a web-server 850 in data communication with the data store 840. A user operating a web-browser 870 via a user processing system 860 can view a web-page generated by the web-server 850 based on the detection data stored in the data store 840.

In particular embodiments, the jamming data may be random data that is generated by the microcontroller. In other embodiments, the jamming data may be data stored in the memory of the microcontroller. In other embodiments, the jamming data is designed to not conform to the communication standard used by RFID communication.

In another embodiment, the device may be embodied with multiple antennas. In particular, the device may include three orthogonal antennas. The multiple antennas provide an advantage that the device does not necessarily need to be at least substantially parallel with the nearby RFID enabled objects to detect a read signal. However, due to the multiple antenna design, the device generally has a non-flat profile. As such the device may be embodied as a cube or some other non-flat structure which can be contained within bags such as handbags, suitcases and backpacks. In one example, the device may be embodied as a key-ring.

The jamming device 10 is generally configured to operate with Type A and/or Type B RFID reader devices.

Referring to FIGS. 9 to 12 there is shown schematics of a jamming device 10 provided in the form of a thin card. In particular, the jamming device 10 includes a body provided in the form of a board 900 which includes the circuit 20, the antenna 30 and the touch interface 40. The antenna and the touch interface 40 are printed on opposite faces of the board 90 so as to maximise the useable area of the board for both applications. The jamming device 10 includes a first cover 910 which covers at least part of the circuit 20. The first cover 910 includes a plurality of pins which protrude into holes 901A, 901B, 901C, 901D which are held to the board using an adhesive. The first cover 910 generally has a protrusion 913 including a two holes 911, 912 exposing the two LEDs 50A, 50B of the circuit 20. The first cover 910 includes a small bevelled edge in order to provide a thin profile for the jamming device 10. The first cover 910 includes a recessed corner to accommodate the touch sensitive interface 40 on the board.

The jamming device 10 also includes a second cover 920 which covers the underside of the board. As shown in FIG. 11, the board 900 includes a cut-out section 905 which enables the battery 99 to partially protrude therethrough or at least partially sit within the cut-out section 905 in order to minimise the thickness of the jamming device such that it can be tight fittingly received within a pocket of a wallet or purse. Due to the cut-out section 905, the jamming device 10 includes the second cover 920 to cover the rear surface of the battery 99. The battery 99 is preferably a Lithium-ion battery. In more preferable embodiments, the battery 99 is a thin cell battery in order to minimise the thickness of the jamming device 10. The second cover 920 includes a small bevelled edge in order to provide a thin profile for the jamming device 10. The first cover 910 is slightly thicker than the second cover, as shown in FIG. 12 due to accommodating the circuit 20 which is provided on a front face of the board 900.

As shown in FIG. 10, a majority of the antenna 30 loops about the periphery of the second cover 920 in an edge section of the board 900. A small portion of the antenna passes under the second cover to connect to the circuit 20. The majority of the antenna 30 is advantageously located external to the second cover 920 to maximise the wireless proximity of the jamming device 10. As can be seen in FIG. 10, the touch interface (shown in dotted line) is also located within a edge section of the board, although on the opposite side of the board, in order to maximise the area which the user can touch to disable the jamming device 10 whilst also providing a sufficient antenna to provide a useful jamming proximity.

It will be appreciated that the antenna 30 transmits the jamming signal substantially co-planar to the board of the jamming device 10, thus RFID enabled objects located behind and in front of the jamming device 10 which are located within the jamming proximity can be inhibited from an unauthorised read.

As shown in FIG. 12, the jamming device 10 provided in the form of a card is preferably a thin device that can be tightfittingly received within a pocket of a wallet, purse or any other card carrying object, wherein the pocket is designed to tight fittingly receive a credit card, debit card, license or the like. In this regard, the jamming device the body has a length between about 80 mm and 90 mm and a width of between about 50 mm to 60 mm. More preferably, the length of the body is about 86 mm and the width of the body is about 54 mm. The jamming device has a thickness between about 1 mm to 3 mm, and more preferably about 2 mm.

In an optional embodiment, the jamming device 10 may be embedded within a card carrying object such as a purse or wallet. The switch interface 40 may be located on an external surface of the card carrying object such that the user is not required to open the card carrying object to disable the device.

It will be appreciated that although the above embodiments have been described with respect to inhibiting unauthorised reading of an RFID enabled object, other contactless readable objects may also be inhibited using the jamming device. In particular, it will be appreciated that objects which are enabled for Near Field Communication (NFC) can also be inhibited using the jamming device due to NFC being a subset of RFID.

It will also be appreciated that the jamming device non-selectively jams the reading of multiple contactless readable objects which are within the jamming proximity should the jamming device be operating in the first mode and an interrogation signal is received.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

The present invention may take the form of an entirely hardware embodiment, an entirely software embodiment, firmware, or an embodiment combining software and hardware aspects.

The invention claimed is:

1. A jamming device for inhibiting unauthorized contactless reading of a contactless readable object when located adjacent to the jamming device, wherein the jamming device includes:
   an antenna for receiving an interrogation signal from a reader device;
   a touch sensitive interface which is separate to the antenna; and
   a circuit operatively connected to the antenna and the touch sensitive interface, wherein the circuit is configured to:
   operate in a first mode to generate and emit a jamming signal, via the antenna, in response to receiving the interrogation signal whilst the touch sensitive interface fails to indicate a touch event, wherein the circuit includes an integrated circuit configured to:
   generate or retrieve jamming data in response to the antenna receiving the interrogation signal; and
   modulate the jamming data with the interrogation signal for generating the jamming signal; and
   operate in a second mode whilst the touch sensitive interface indicates a touch event, wherein the jamming signal is not emitted via the antenna in response to receiving the interrogation signal whilst operating in the second mode.

2. The jamming device according to claim 1, wherein the circuit generates the jamming signal to be indicative of random data.

3. The jamming device according to claim 1, wherein the body is a board which provides the circuit, the antenna and the touch sensitive interface.

4. The jamming device according to claim 3, wherein the antenna is provided on a first face of the board and the touch sensitive interface is provided on a second face of the board.

5. The jamming device according to claim 4, wherein the touch sensitive interface is located at an edge section of the first face of the board and a majority of the antenna is located at an edge section of the second face of the board.

6. The jamming device according to claim 3, wherein the jamming device includes at least one cover for covering at least part of the circuit on the board.

7. The jamming device according to claim 6, wherein the jamming device includes a battery electrically connected to the circuit, wherein the at least one cover covers the battery.

8. The jamming device according to claim 7, wherein the board includes a cut-out section which the battery partially protrudes therethrough or is at least partially located therein.

9. The jamming device according to claim 8, wherein the at least one cover includes a first cover and a second cover, wherein the first cover covers at least part of a first side of the board and the second cover covers at least part of a second side of the board such that the battery is covered by the first and second covers.

10. The jamming device according to claim 6, wherein the at least one cover does not cover a majority of the antenna provided on the board, wherein the majority of the antenna loops about a periphery of the at least one cover.

11. The jamming device according to claim 1, wherein the circuit includes one or more visual indicators which are controllable by the integrated circuit to indicate at least one of:
   the circuit operating in the second mode; and
   the circuit detecting the interrogation signal whilst operating in the first mode.

12. The jamming device according to claim 11, wherein the one or more indicators include a second mode indicator controllable by the integrated circuit for indicating whether the circuit is operating in the second mode.

13. The jamming device according to claim 12, wherein the one or more indicators include a jamming indicator controllable by the integrated circuit for indicating transmission of the jamming signal.

14. The jamming device according to claim 1, wherein the touch sensitive interface is one of:
   a capacitive sensing interface; and
   a resistive sensing interface.

15. The jamming device of claim 1, wherein the jamming device includes:
   a battery;
   an integrated circuit electrically connected to the battery and the circuit; and
   the circuit includes one or more visual indicators which are controllable by the integrated circuit to indicate at least one of:
   the circuit operating in the second mode; and the circuit detecting the interrogation signal whilst operating in the first mode.

16. The jamming device according to claim 1, wherein the jamming device has a body having a planar shaped profile having a first face providing the antenna and a second face opposing the first face providing the touch sensitive interface, wherein respective footprints of the antenna and the touch sensitive interface at least partially overlap.

17. The jamming device according to claim 1, wherein the jamming device includes a body having a planar shaped profile having a first face and a second face opposing the first face, wherein the body has a card shaped profile, wherein the card shaped profile of the body is sized for being tight fittingly received within a pocket of a card carrying object, wherein the pocket is sized to tightly receive a credit card.

18. A jamming device for inhibiting unauthorized contactless reading of a contactless readable object when located adjacent to the jamming device, wherein the jamming device includes:
   an antenna for receiving an interrogation signal from a reader device;
   a touch sensitive interface which is separate to the antenna; and
   a circuit operatively connected to the antenna and the touch sensitive interface, wherein the circuit is configured to:
   operate in a first mode to generate and emit a jamming signal, via the antenna, in response to receiving the interrogation signal whilst the touch sensitive interface fails to indicate a touch event;
   operate in a second mode whilst the touch sensitive interface indicates a touch event, wherein the jamming signal is not emitted via the antenna in response to receiving the interrogation signal whilst operating in the second mode;
   a battery; and
   an integrated circuit electrically connected to the battery and the circuit;
   wherein the circuit includes one or more visual indicators which are controllable by the integrated circuit to indicate at least one of:
   the circuit operating in the second mode; and
   the circuit detecting the interrogation signal whilst operating in the first mode.

19. The jamming device according to claim 18, wherein the circuit includes an integrated circuit configured to:
   generate or retrieve jamming data in response to the antenna receiving the interrogation signal; and
   modulate the jamming data with the interrogation signal for generating the jamming signal.

20. A jamming device for inhibiting unauthorized contactless reading of a contactless readable object when located adjacent to the jamming device, wherein the jamming device includes:
   an antenna for receiving an interrogation signal from a reader device;
   a touch sensitive interface which is separate to the antenna; and
   a circuit operatively connected to the antenna and the touch sensitive interface, wherein the circuit is configured to:
   operate in a first mode to generate and emit a jamming signal, via the antenna, in response to receiving the interrogation signal whilst the touch sensitive interface fails to indicate a touch event;
   operate in a second mode whilst the touch sensitive interface indicates a touch event, wherein the jamming signal is not emitted via the antenna in response to receiving the interrogation signal whilst operating in the second mode; and
   a body having a planar shaped profile having a first face providing the antenna and a second face opposing the first face providing the touch sensitive interface, wherein respective footprints of the antenna and the touch sensitive interface at least partially overlap.

* * * * *